(12) United States Patent
Kido et al.

(10) Patent No.: US 7,336,444 B2
(45) Date of Patent: Feb. 26, 2008

(54) MAGNETIC HEAD ASSEMBLY

(75) Inventors: Takuma Kido, Kawasaki (JP); Tomoo Sukagawa, Higashine (JP); Keiji Aruga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 11/137,472

(22) Filed: May 26, 2005

(65) Prior Publication Data

US 2006/0176617 A1 Aug. 10, 2006

(30) Foreign Application Priority Data

Feb. 9, 2005 (JP) ............................. 2005-033516

(51) Int. Cl.
*G11B 5/48* (2006.01)
(52) U.S. Cl. ................................................. 360/244.9
(58) Field of Classification Search ............. 360/244.9, 360/245.3
See application file for complete search history.

(56) References Cited

U.S. PATENT DOCUMENTS

| | | | |
|---|---|---|---|
| 5,530,606 A | 6/1996 | Baasch et al. ............... | 360/104 |
| 5,623,758 A | 4/1997 | Brooks, Jr. et al. ...... | 29/603.01 |
| 5,796,553 A | 8/1998 | Tangren ...................... | 360/104 |
| 5,943,191 A | 8/1999 | Giere et al. ................. | 360/104 |
| 2005/0122626 A1* | 6/2005 | Suzuki ..................... | 360/244.9 |
| 2005/0135013 A1 | 6/2005 | Sassine et al. ........... | 360/244.9 |

FOREIGN PATENT DOCUMENTS

| | | |
|---|---|---|
| JP | 57-105860 | 7/1982 |
| JP | 63-157358 | 6/1988 |
| JP | 5-325459 | 12/1993 |
| JP | 2001-28174 | 1/2001 |
| KR | 2001-0039598 | 5/2001 |
| WO | WO 2004/040571 A1 | 5/2004 |
| WO | WO 2004/040572 A1 | 5/2004 |

OTHER PUBLICATIONS

European Search Report dated Apr. 4, 2006.
Korean Office Action dated Apr. 2, 2007.

* cited by examiner

*Primary Examiner*—A. J. Heinz
*Assistant Examiner*—Mark Blouin
(74) *Attorney, Agent, or Firm*—Kratz, Quintos & Hanson, LLP

(57) ABSTRACT

Vibrations in a magnetic head assembly equipped with a magnetic head, caused by the effects of the flow of air arising from the high-speed rotation of a magnetic disk, can be suppressed by affixing a damping material to the magnetic head assembly. As a result, accurate positioning is possible with high reliability, the frequency of occurrence of errors during data recording and playback can be suppressed, high data transfer rates can be maintained, and high recording densities for a magnetic disk device can be realized.

14 Claims, 9 Drawing Sheets

PRIOR ART

MAGNETIC HEAD ASSEMBLY

BACKGROUND OF THE INVENTION

1. Field of the Invention

This invention relates to a magnetic head assembly in a magnetic disk device, and in particular to a magnetic head assembly which suppresses vibrations.

2. Description of the Related Art

A magnetic disk device causes a magnetic disk, comprising ferromagnetic material, to rotate, and by scanning a magnetic head over the magnetic disk records and reproduces information; such devices are widely used as auxiliary storage devices in computers.

With the expansion of magnetic disk device capacities in recent years, there has been increased need for higher recording densities. Methods of raising recording densities include methods to increase the linear recording density in the track direction, and methods to raise the recording density in the radial direction of the magnetic disk by reducing the track width and track pitch. In order to raise the recording density through the latter methods in particular, a magnetic head assembly is desired which affords high reliability and accurate positioning. However, in a magnetic disk device the high-speed rotation of the magnetic disk causes air flow, and the magnetic head assembly on which the magnetic head is mounted undergoes vibrations. In a magnetic disk device in which submicron positioning is required, the influence of air flow and vibrations makes accurate positioning difficult, and causes detracking. If detracking occurs frequently, the frequency of occurrence of data record/playback errors is increased, and the data transfer rate declines.

FIG. 1 shows the configuration of a conventional magnetic head assembly. The magnetic head i flies while maintaining a gap of nanometer order during recording and playback, to scan the magnetic disk. The magnetic head 1 is mounted on the magnetic head assembly with a flexure 2 intervening, provided so as to oppose the magnetic disk. The flexure 2 is formed for low rigidity in order to improve tracking ability of the magnetic disk 1 with respect to the magnetic disk, and comprises wiring to transmit the information received and read by the magnetic head as well as information for the magnetic head to write. The flexure 2 comprises an extremely thin leaf spring, fixed to the load beam 3 by laser welding or another means. One end of the load beam 3 supports the magnetic head by means of a dimple; the other end is joined to the actuator arm via a base plate 4. The base plate 4 is a member used to mount the magnetic head assembly on the actuator arm. The load beam 3 is a spring member which generates a load to balance the flight of the magnetic head 1; the gimbal portion 5 is a spring member which supports the magnetic head 1 and which, by elastic deformation on the plane not parallel to the disk surface, absorbs disk runout and inclination without detracting from the tracking performance. Through this construction, the magnetic head 1 can move while maintaining a stable state over a prescribed track of the rotating disk.

FIG. 2 is an enlarged drawing of the vicinity of a magnetic head. The magnetic head 1 is joined using adhesive the gimbal portion 5 of the flexure 2. The gimbal portion 5 of the flexure 2 is supported at a single point by the dimple 6 of the load beam 3.

FIG. 3 shows the joined portion of the flexure and load beam. The flexure 2 and load beam 3 are jointed by laser welding. The base plate 4 and load beam 3, and the base plate 4, load beam 3 and flexure 2 are similarly joined by laser welding.

FIG. 4 shows a configuration in which a damping material is employed in the magnetic head assembly, in order to suppress load beam torsion mode vibrations. A damping material 8 is affixed to the load beam 3, on the side of the base plate 4 from the laser-welded portion 40 of the flexure 2 and load beam 3. By this means, vibrations in the load beam 3 in the X-axis direction with the Y=0 plane as the center of symmetry can be suppressed. Suppression of vibrations through application of damping material to a load beam 3 is described in Japanese Patent Laid-open No. 5-325459.

However, although it is possible tot suppress torsion mode vibrations in the load beam 3 of a magnetic head assembly by affixing such damping material, suppression of other vibration modes cannot be expected.

Moreover, randomly affixing the damping material in a magnetic head assembly incurs increased manufacturing costs and so is undesirable. Further, efforts are made to decrease the moment of inertia with respect to rotation of the actuator arm during positioning, by for example providing holes penetrating the base plate, in order to realize rapid positioning of the magnetic head assembly. Randomly affixing damping material results in increases in the moment of inertia of rotation centered on the actuator of the magnetic head assembly, and so is undesirable.

Hence one object of the invention is to provide a method of suppression of magnetic head assembly vibrations, caused by the effects of the flow of air arising from the high-speed rotation of the magnetic disk in the magnetic disk device. A further object is to provide a method which, while suppressing such vibrations, minimizes the increase in mass of the magnetic head assembly and the increase in manufacturing costs.

SUMMARY OF THE INVENTION

In order to resolve the above problems, according to a first aspect of the invention a magnetic head assembly, having a magnetic head, a flexure supporting the magnetic head and having wiring to transmit information received and read by the magnetic head and information for writing by the magnetic head, and a load beam supporting the flexure and which generates a load to balance the head, is characterized in having a damping material affixed to the load beam and to the flexure from the side of the flexure.

A preferred embodiment of the above first aspect of the invention is characterized in that at least a portion of the damping material is positioned on the side of the magnetic head portion from the welded position of the flexure and the load beam.

A preferred embodiment of the above first aspect of the invention is characterized in that a taper is provided in the flexure such that the boundary with the load beam is made smooth, and that the damping material is affixed to the load beam and to the flexure from the flexure side.

A preferred embodiment of the above first aspect of the invention is characterized in that a folded-over portion, which absorbs a step between the load beam and the flexure, is provided in the damping material, and in that the damping material is affixed to the load beam and to the flexure from the flexure side.

A preferred embodiment of the above first aspect of the invention is characterized in that the constraining layer of the damping material is a polyimide, and the elastic layer is a VEM.

A preferred embodiment of the above first aspect of the invention is characterized in that the constraining layer of the damping material is stainless steel, and the elastic layer is a VEM.

According to a second aspect of the invention, a magnetic head assembly, having a magnetic head, a flexure supporting the magnetic head and having wiring to transmit information received and read by the magnetic head and information for writing by the magnetic head, and a load beam supporting the flexure and which generates a load to balance the head, is characterized in having a damping material affixed to the load beam and to the flexure from the side of the load beam.

A preferred embodiment of the above second aspect of the invention is characterized in that at least a portion of the damping material is positioned on the side of the magnetic head portion from the welded position of the flexure and the load beam.

A preferred embodiment of the above second aspect of the invention is characterized in that a folded-over portion, which absorbs a step between the load beam and the flexure, is provided in the damping material, and in that the damping material is affixed to the load beam and to the flexure from the load beam side.

A preferred embodiment of the above second aspect of the invention is characterized in that a taper is provided in the flexure such that the boundary with the load beam is made smooth, and that the damping material is affixed to the load beam and to the flexure from the load beam side.

A preferred embodiment of the above second aspect of the invention is characterized in that the constraining layer of the damping material is a polyimide, and the elastic layer is a VEM.

A preferred embodiment of the above second aspect of the invention is characterized in that the constraining layer of the damping material is stainless steel, and the elastic layer is a VEM.

According to a third aspect of the invention, a magnetic head assembly, having a magnetic head, a flexure supporting the magnetic head and having wiring to transmit information received and read by the magnetic head and information for writing by the magnetic head, a load beam supporting the flexure and which generates a load to balance the head, and a base plate which mounts the flexure on an actuator arm, is characterized in having a damping material affixed to the base plate.

A preferred embodiment of the above third aspect of the invention is characterized in that the base plate has a penetrating hole, and that the damping material is affixed near the penetrating hole.

A preferred embodiment of the above third aspect of the invention is characterized in that the load beam and the base plate have a mutually overlapping portion, that a taper is provided in the load beam such that the boundary with the base plate is smooth, and that the damping material is affixed to the load beam and to the base plate from the side of the overlapping portion of the load beam.

A preferred embodiment of the above third aspect of the invention is characterized in that the load beam and the base plate have a mutually overlapping portion, that a folded-over portion, which absorbs a step between the load beam and the base plate, is provided in the damping material, and that the damping material is affixed to the load beam and to the base plate from the side of the overlapping portion of the load beam.

A preferred embodiment of the above third aspect of the invention is characterized in that the constraining layer of the damping material is a polyimide, and the elastic layer is a VEM.

A preferred embodiment of the above third aspect of the invention is characterized in that the constraining layer of the damping material is stainless steel, and the elastic layer is a VEM.

This invention enables suppression of vibrations in a magnetic head assembly on which a magnetic head is mounted, caused by the effects of the flow of air arising from the high-speed rotation of the magnetic disk in the magnetic disk device.

DESCRIPTION OF THE PREFERRED EMBODIMENTS

Figure 1:
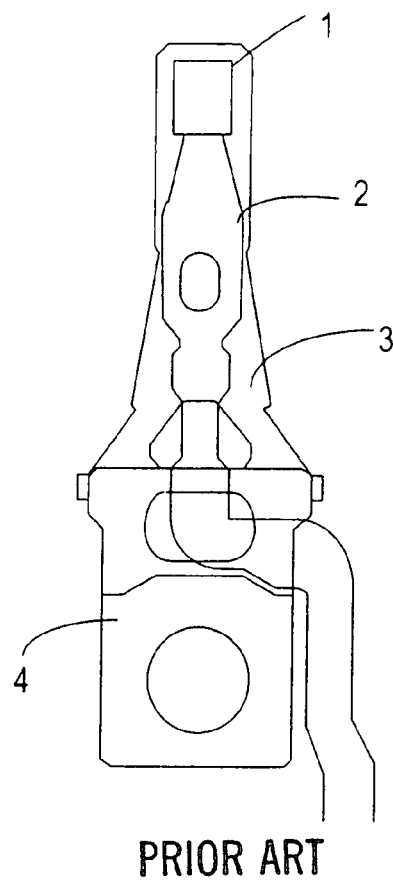
FIG. 1 shows the configuration of a conventional magnetic head assembly.
Figure 2:
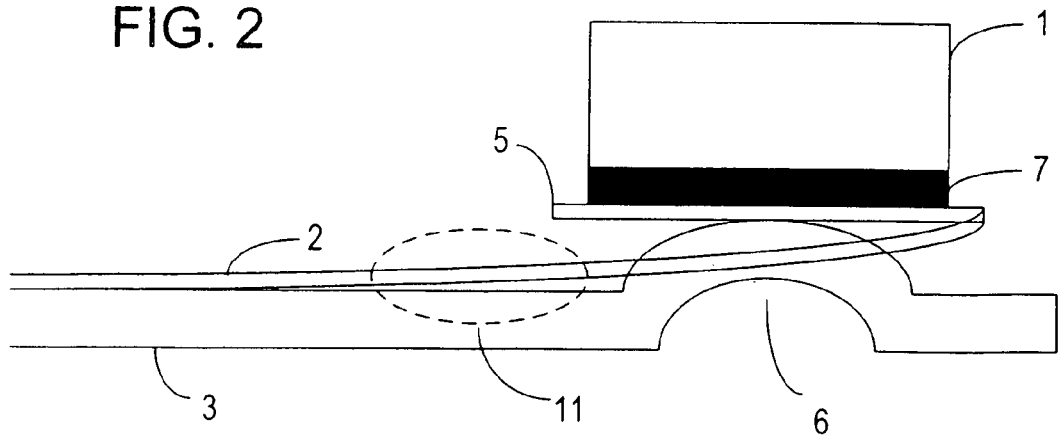
FIG. 2 is an enlarged drawing of the vicinity of a magnetic head.
Figure 3:
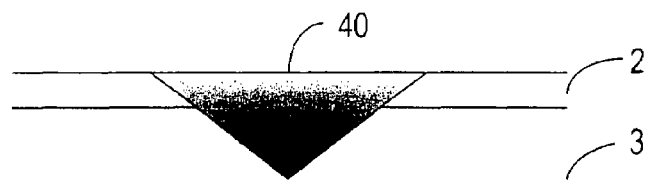
FIG. 3 shows the joined portion of a flexure and load beam.
Figure 4:
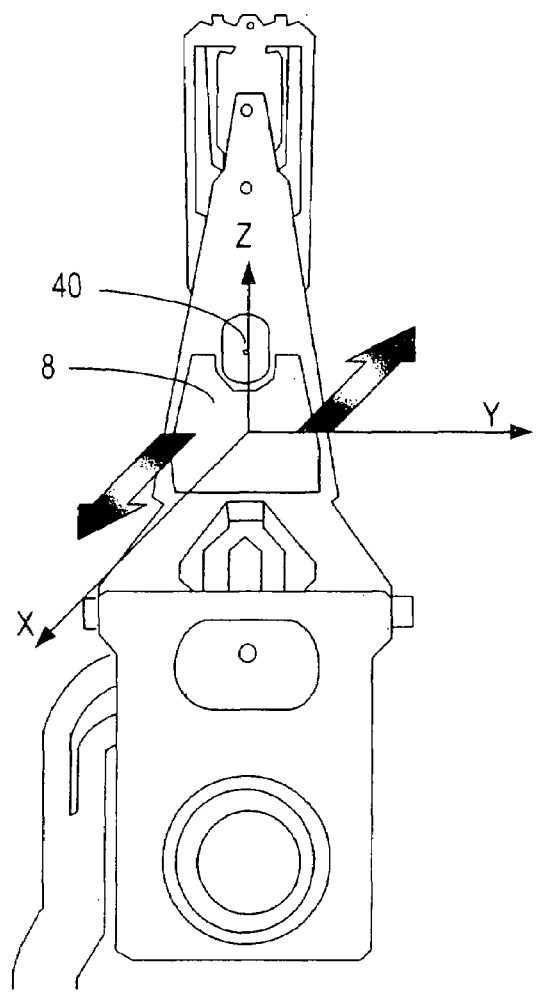
FIG. 4 shows a configuration in which a damping material is applied to a magnetic head assembly in order to suppress torsion mode vibrations in the load beam.

Below, aspects of the invention are explained referring to the drawings. However, the technical scope of the invention is not limited to these aspects, but extends to the inventions described in the scope of claims, and to inventions equivalent thereto.

Figure 5:
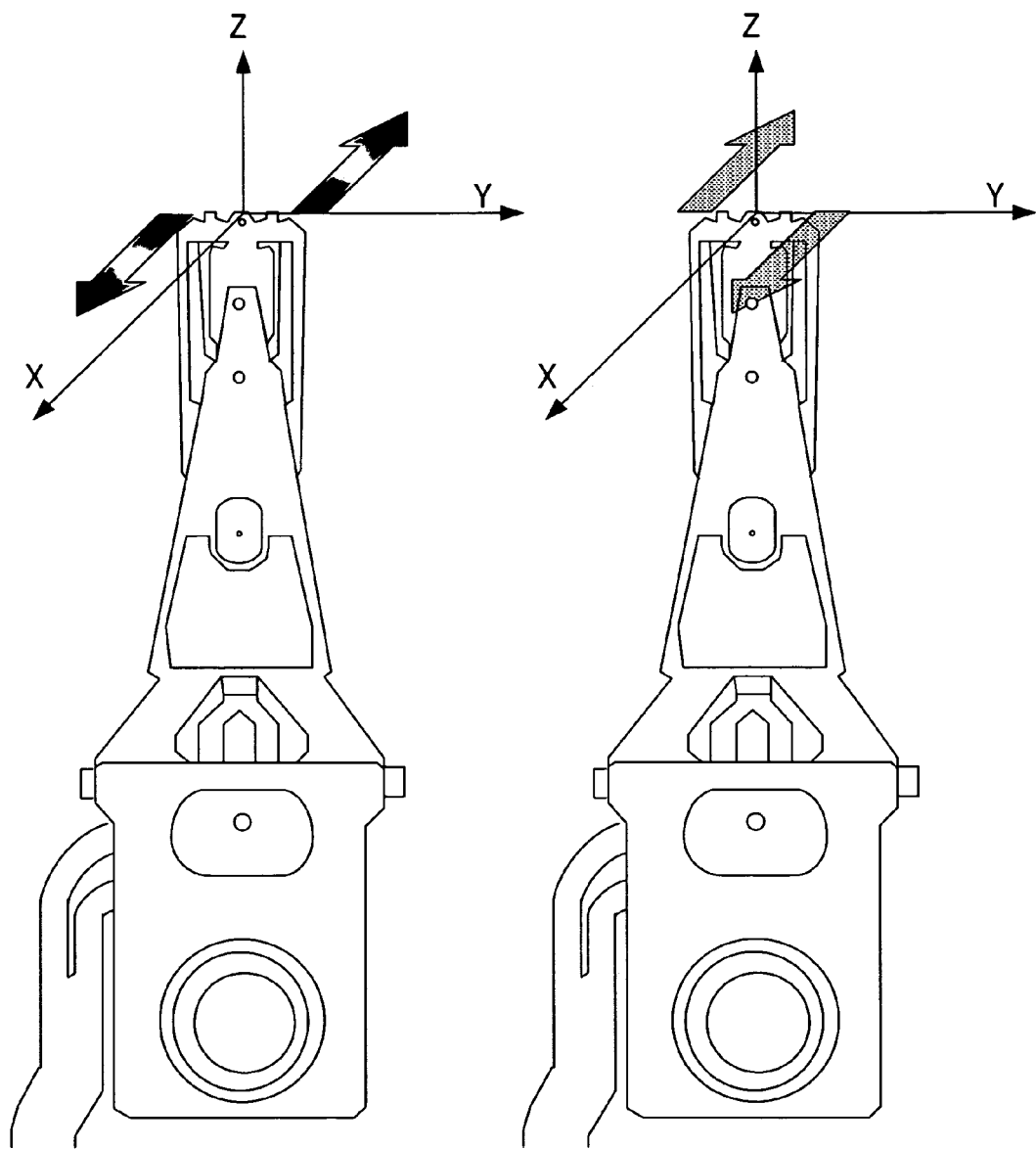
FIG. 5 shows torsion mode vibrations of a flexure.

FIG. 5 shows torsion mode vibrations in a flexure. As shown in FIG. 5, during operation of the magnetic disk device the magnetic head 1 and the gimbal support portion 11 of the flexure 2 vibrate in opposite phase in the X-axis direction, to constitute torsion mode vibration.

Figure 6:
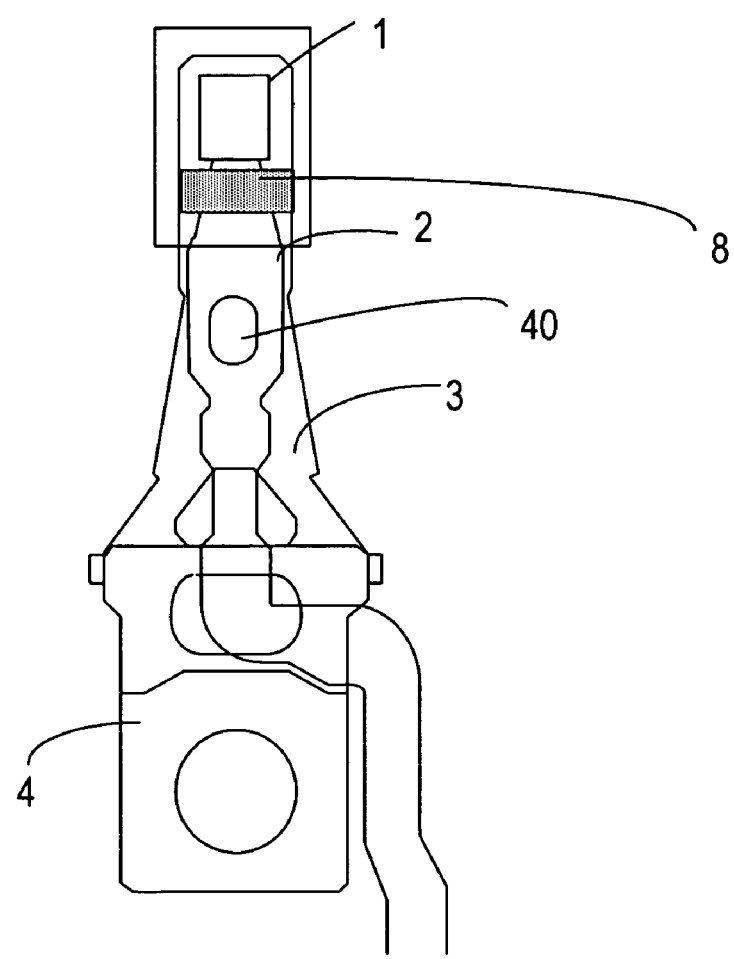
FIG. 6 shows the configuration of the magnetic head assembly in a first aspect of the invention.

FIG. 6 shows the configuration of the magnetic head assembly in a first aspect of the invention. A damping material 8 is installed at the gimbal support portion 11 adjacent to the magnetic head 1, affixed so that the flexure 2 is enclosed between the damping material 8 and the load beam 3, of comparatively high rigidity. By affixing the damping material 8 at a position closer to the magnetic head than the laser welded portion 40, an effect in suppressing torsion mode vibrations of the flexure 2 is obtained.

Figure 7:
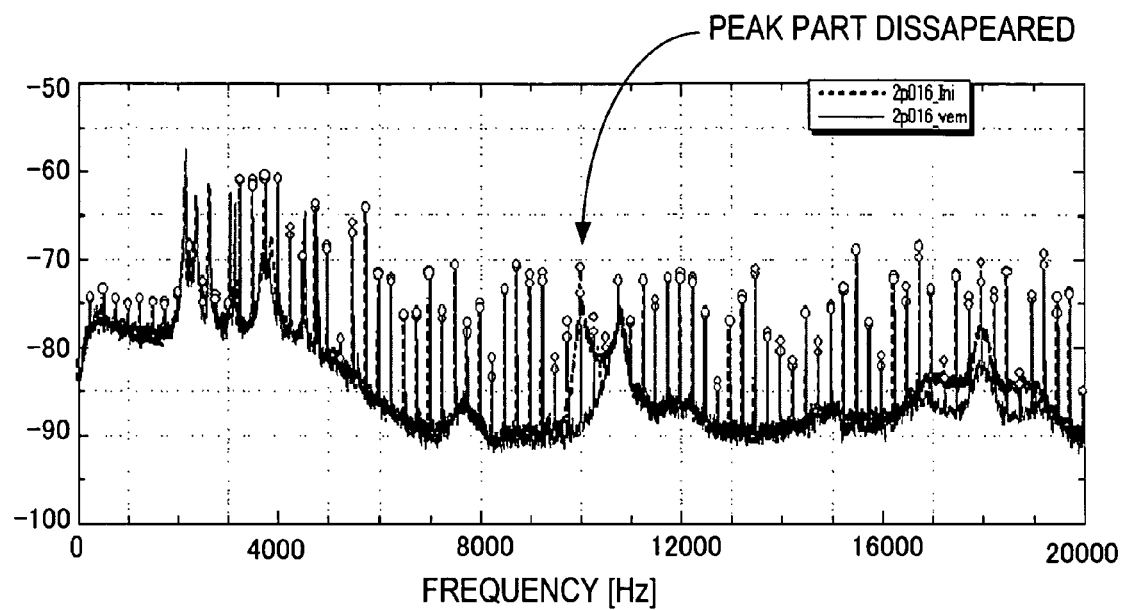
FIG. 7 shows a flexure torsion mode vibration spectrum.

FIG. 7 shows a flexure torsion mode vibration spectrum. Here the broken line indicates the vibration spectrum of a conventional magnetic head assembly, and the solid line is the vibration spectrum of a magnetic head assembly to which the first aspect of the invention has been applied. As a result of application of the damping material 8 shown in FIG. 6, it is seen that a vibration peak existing near 10 kHz has disappeared.

The damping material 8 used here employs a polyimide as the constraining layer and a VEM (Viscoelastic Material) as the elastic layer. The thicknesses of the constraining layer and of the elastic layer are both approximately 50 μm. The polyimide has heat resistance up to 500° C., normally has a low dielectric constant of 3.2 to 3.4, has excellent ductility, and also has an excellent thermal expansion coefficient, as well as excellent mechanical strength and resistance to chemical reagents. The VEM is a polymer compound exhibiting mechanical behavior which combines viscosity and elasticity. The VEM is affixed to the surface of the vibrating member, and on top of this the constraining layer is affixed; as a result the VEM receives deformation and generates an internal resistance, converting this into thermal energy in order to attenuate vibrations. Because vibrations are absorbed and converted into thermal energy, vibrations and solid-state sounds disappear, so that resonance vibrations and sounds are prevented. Moreover, the VEM has excellent adhesive properties, with highly satisfactory machinability, heat resistance and weather resistance, and does not melt even at elevated temperatures.

In the above embodiment, an example is described in which a polyimide is used as the damping material, but the damping material is not limited to a polyimide, and stainless steel can be used as the constraining layer. Also, a VEM can be used as the elastic layer even when stainless steel is used as the constraining layer.

Figure 8:
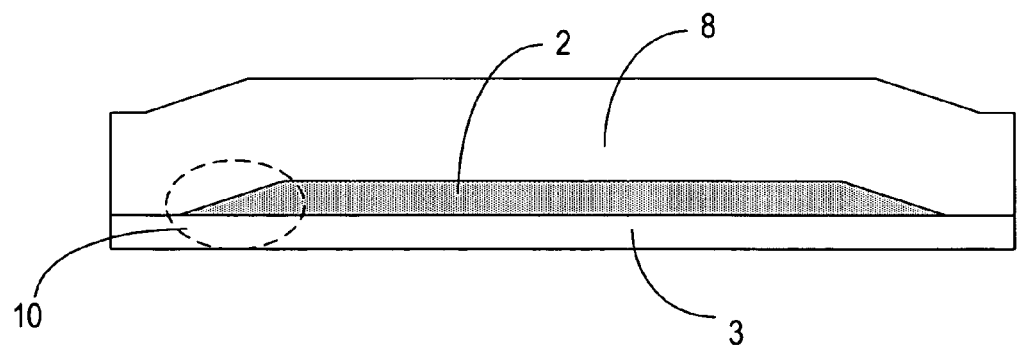
FIG. 8 is a cross-sectional view of the gimbal support portion when the flexure is provided with a taper.

FIG. 8 is a cross-sectional view of the gimbal support portion when the flexure is provided with a taper. The damping material 8 is affixed so as to press against the flexure 2 provided with a taper 10. By this means, the gap between the load beam 3 and the damping material 8 is eliminated, the step between the members is absorbed, and reliable affixing is possible. There is the further advantageous result that peeling does not occur readily during cleaning or at other times.

Figure 9:
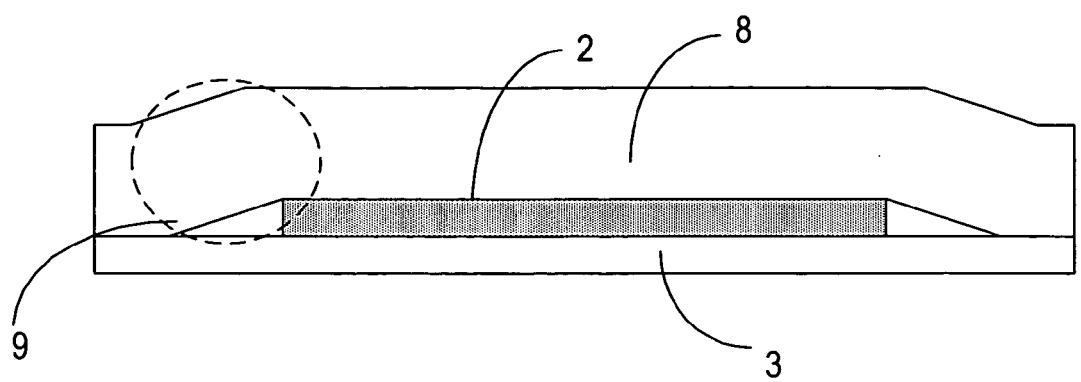
FIG. 9 is a cross-sectional view of the gimbal support portion when the damping material is provided with a folded-over portion.

FIG. 9 is a cross-sectional view of the gimbal support portion when the damping material is provided with a folded-over portion. By providing a folded-over portion 9 in the damping material 8, affixing is possible with the step between the flexure 2 and the load beam 3 eliminated. By this means, the step between the members can be absorbed, and reliable affixing is possible.

Thus vibrations in a magnetic head assembly equipped with a magnetic head, arising from the of the flow of air arising from the high-speed rotation of the magnetic disk in the magnetic disk device, can be suppressed by affixing the damping material 8 to the flexure 2 of the magnetic head assembly. As a result, a magnetic disk device with high recording density can be realized in which reliability is improved, accurate positioning is possible, and the frequency of error occurrence during data recording and playback can be kept low, while maintaining a high data transfer rate.

Figure 10:
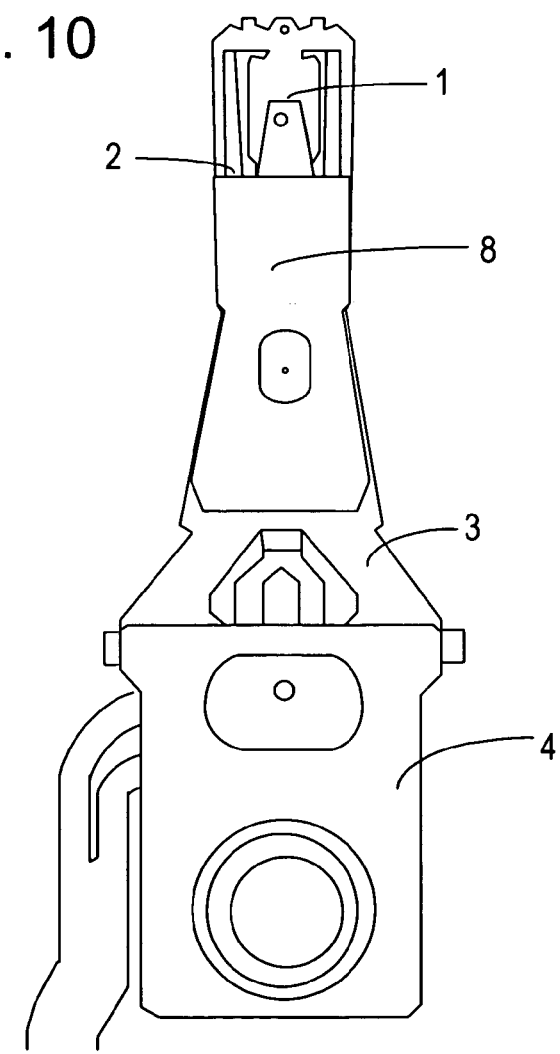
FIG. 10 shows the configuration of the magnetic head assembly in a second aspect of the invention.

FIG. 10 shows the configuration of the magnetic head assembly in a second aspect of the invention. The damping material for torsion mode vibrations of the flexure 2 and the damping material for torsion mode vibrations of the load beam 3 are combined. By combining the damping material for vibrations of the flexure 2 of this invention with the damping material conventionally affixed to the load beam 3, processes to affix damping materials 8 can be incorporated into a single process, to lower costs; in addition, affixing is easier than when affixing a small amount of damping material, and stable affixing quality can be obtained.

Figure 11:
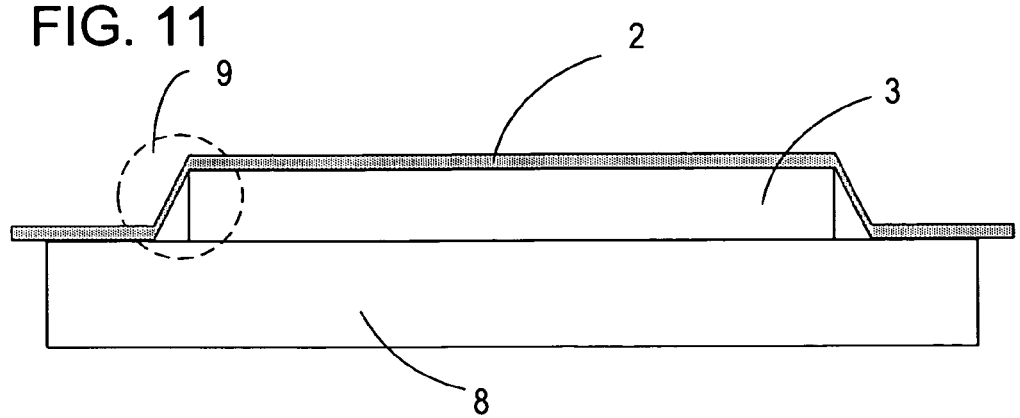
FIG. 11 is a cross-sectional view of the gimbal support portion when the flexure is provided with a folded-over portion.

FIG. 11 is a cross-sectional view of the gimbal support portion when the flexure is provided with a folded-over portion. By providing the flexure 2 with a folded-over portion 9, the step between the load beam 3 and the flexure 2 is eliminated, and the damping material 8 can be affixed thereto. In order to absorb the step between the members, the gimbal support portion 11 of the flexure 2 is folded over, and the damping material 8 is affixed reliably, so that the damping material 8 functions more effectively, and peeling or similar of the damping material 8 is avoided. By this means, affixing of the damping material 8 is facilitated. And when assembling the magnetic head assembly, there is the advantageous result that peeling does not occur readily during cleaning or similar.

Figure 12:
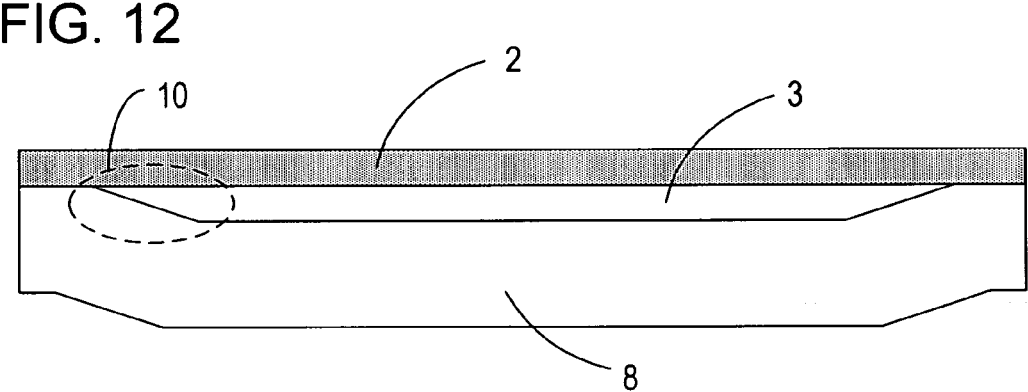
FIG. 12 is a cross-sectional view of the gimbal support portion when the load beam is provided with a taper.

FIG. 12 is a cross-sectional view of the gimbal support portion when the load beam is provided with a taper. By providing the load beam 3 with a taper 10, the gap between the flexure 2 and the damping material 8 can be eliminated, and the boundary surface between the flexure 2 and the load beam 3 can be made smooth. As a result, affixing of the damping material 8 is further facilitated. There is the added advantageous result that peeling does not occur readily during cleaning or similar.

Thus by affixing the damping material 8 to a magnetic head assembly, vibrations in the magnetic head assembly equipped with a magnetic head 1, caused by the effects of the flow of air arising from the high-speed rotation of the magnetic disk in the magnetic disk device, can be suppressed. As a result, a magnetic disk device with higher recording density, capable of accurate positioning with high reliability, with the frequency of occurrence of errors during data recording and playback held low and with a high data transfer rate maintained, can be realized.

Figure 13:
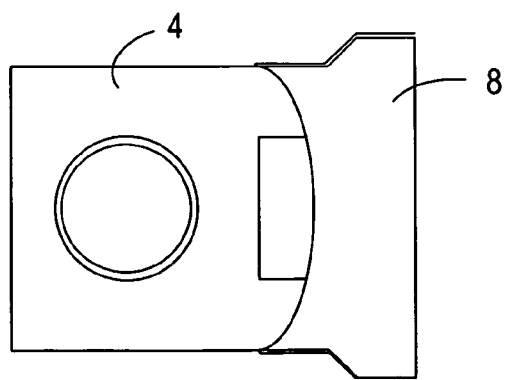
FIG. 13 shows the configuration of the magnetic head assembly in a third aspect of the invention.
Figure 14:
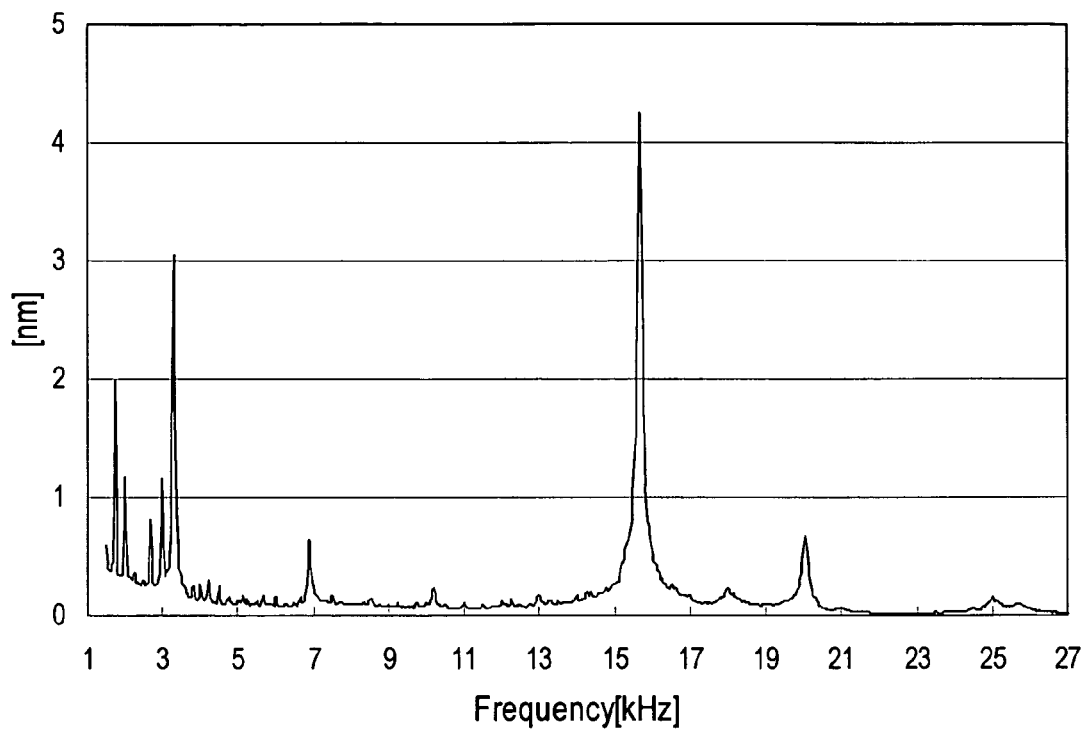
FIG. 14 shows the vibration spectrum in a conventional magnetic head assembly in which a damping material is not affixed to the base plate.
Figure 15:
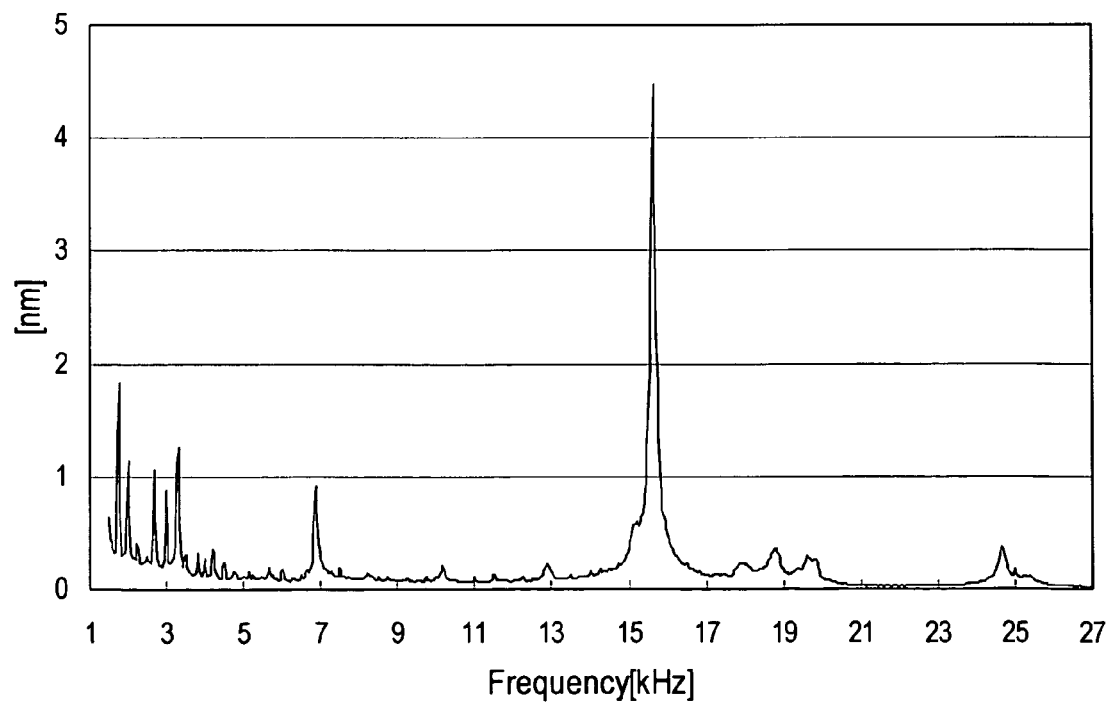
FIG. 15 shows the vibration spectrum in a magnetic head assembly to which this invention is applied, in which a damping material is affixed to the base plate.

FIG. 13 shows the configuration of the magnetic head assembly in a third aspect of the invention. In this embodiment, a damping material 8 is affixed to the base plate 4. FIG. 14 shows the vibration spectrum in a conventional magnetic head assembly in which the damping material is not affixed to the base plate. Also, FIG. 15 shows the vibration spectrum in a magnetic head assembly to which this invention is applied, in which the damping material is affixed to the base plate. Compared with the spectrum in FIG. 14, in FIG. 15 the vibration peak portion ear 3 to 4 kHz is small. Here also a polyimide is used as the constraining layer of the damping material 8, and a VEM is used as the elastic layer. The thicknesses of the constraining layer and of the elastic layer are both approximately 50 μm. The VEM serves the purpose of bonding the polyimide to the base plate 4.

Figure 16:
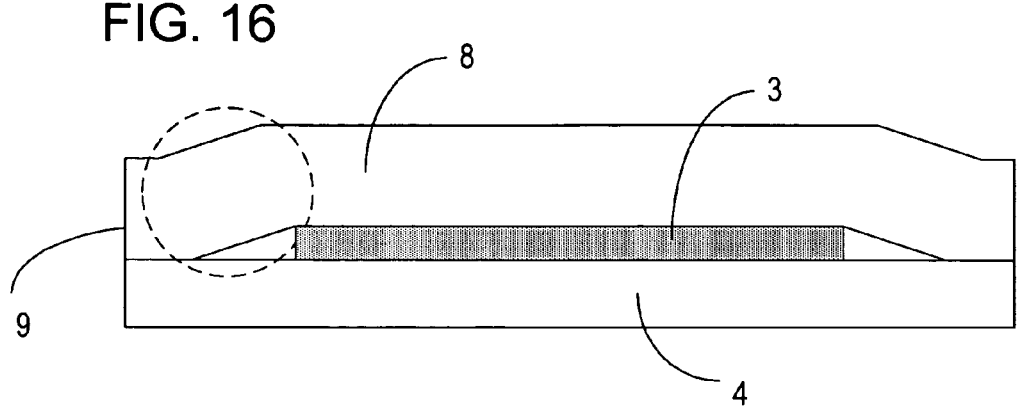
FIG. 16 is a cross-sectional view of a case in which the damping material employed in the base plate is provided with a folded-over portion; and, FIG. 17 is a cross-sectional view of the vicinity of the base plate when the load beam is provided with a taper.

FIG. 16 is a cross-sectional view of a case in which the damping material employed in the base plate is provided with a folded-over portion. By providing the damping material 8 with a folded-over portion 9, affixing can be performed with the step between the base plate 4 and the load beam 3 eliminated. By this means the step between the members can be absorbed, and affixing can be performed reliably.

Figure 17:
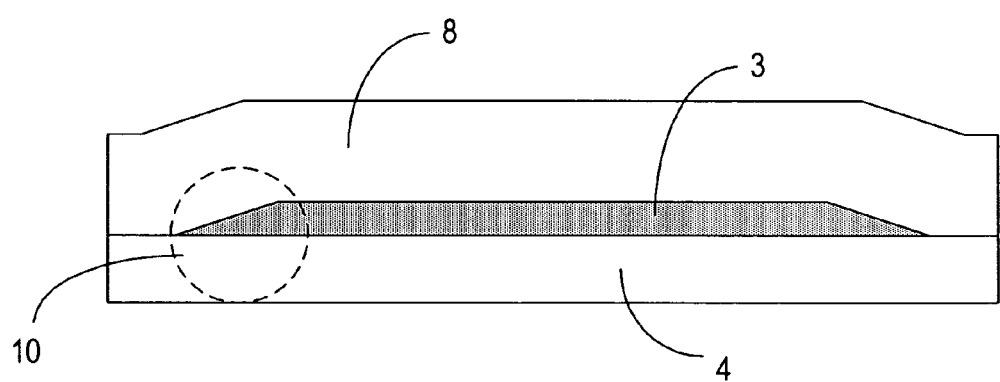

FIG. 17 is a cross-sectional view of the vicinity of the base plate when the load beam is provided with a taper. By providing the load beam 3 with a taper 10, the gap between the base plate 4 and damping material 8 can be eliminated, and the boundary surface between base plate 4 and load beam 3 can be made smooth. By this means, affixing of the damping material 8 can be made still easier. There is also the advantageous result that peeling does not occur readily during cleaning or similar.

Thus by affixing damping material 8 to the base plate 4 of a magnetic head assembly, vibrations in the magnetic head assembly equipped with a magnetic head 1, caused by the effects of the flow of air arising from the high-speed rotation of the magnetic disk in the magnetic disk device, can be suppressed. As a result, a magnetic disk device with higher recording density, capable of accurate positioning with high reliability, with the frequency of occurrence of errors during data recording and playback held low and with a high data transfer rate maintained, can be realized.

In the above embodiments, examples were described in which a polyimide was used as the damping material; but the damping material is not limited thereto, and stainless steel can be used as the constraining layer, and a VEM as the elastic layer.

By means of this invention, vibrations in the magnetic head assembly of a magnetic disk device can be suppressed. As a result, head positioning can be performed with greater accuracy during reading and writing, with the advantage of mitigating detracking and enabling higher recording densities in the magnetic disk device.

What is claimed is:

1. A magnetic head assembly, comprising:
   a magnetic head;
   a flexure supporting said magnetic head and having wiring to transmit information received and read by said magnetic head and information for writing by said magnetic head; and,
   a load beam supporting said flexure and which generates a load to balance said head, the magnetic head assembly further comprising
   a damping material affixed to said load beam and to said flexure from a side of said flexure, wherein
   said damping material further comprises a constraining layer and an elastic layer,
   said flexure further comprises a gimbal portion which supports said magnetic head; and a gimbal support portion which supports said gimbal portion,
   said load beam further comprises a dimple portion which supports said gimbal portion at a single point, and
   said damping material is affixed so that said flexure is enclosed at said gimbal portion.

2. A magnetic head assembly, comprising:
   a magnetic head;
   a flexure supporting said magnetic head and having wiring to transmit information received and read by said magnetic head and information for writing by said magnetic head; and,
   a load beam supporting said flexure and which generates a load to balance said head, the magnetic head assembly further comprising
   a damping material affixed to said load beam and to said flexure from a side of said load beam, wherein
   said damping material further comprises a constraining layer and an elastic layer,
   said flexure further comprises a gimbal portion which supports said magnetic head; and a gimbal support portion which supports said gimbal portion,
   said load beam further comprises a dimple portion which supports said gimbal portion at a single point, and
   said damping material is affixed on said flexure and said load beam so that said flexure is enclosed at said gimbal support portion.

3. The magnetic head assembly according to claim 1 or claim 2, wherein at least a portion of said damping material is positioned on a side of said magnetic head portion from a welded position of said flexure and said load beam.

4. The magnetic head assembly according to claim 1 or claim 2, wherein said flexure is provided with a taper so as to smooth the boundary with said load beam.

5. The magnetic head assembly according to claim 1 or claim 2, wherein said damping material is provided with a folded-over portion which absorbs the step between said load beam and said flexure.

6. A magnetic head assembly, comprising:
   a magnetic head;
   a flexure supporting said magnetic head and having wiring to transmit information received and read by said magnetic head and information for writing by said magnetic head;
   a load beam supporting said flexure and which generates a load to balance said head;
   a base plate, to mount said head, said load beam, and said flexure on an actuator arm; and,
   a damping material affixed to said base plate, wherein
   said damping material further comprises a constraining layer and an elastic layer,
   said flexure further comprises a gimbal portion which supports said magnetic head; and a gimbal support portion which supports said gimbal portion, and
   said load beam further comprises a dimple portion which supports said gimbal portion at a single point.

7. The magnetic head assembly according to claim 6, wherein said base plate has a penetrating hole, and said damping material is affixed near said penetrating hole.

8. A magnetic head assembly comprising;
   a magnetic head;
   a flexure supporting said magnetic head and having wiring to transmit information received and read by said magnetic head and information for writing by said magnetic head;
   a load beam supporting said flexure and which generates a load to balance said head;
   a base plate, to mount said head, said load beam, and said flexure on an actuator arm; and,
   a damping material affixed to said base plate, wherein
   said load beam and said base plate have a mutually overlapping portion, said load beam is provided with a taper so as to smooth the boundary with said base plate, and said damping material is affixed to said load beam and to said base plate from the side of said overlapping portion of said load beam.

9. A magnetic head assembly comprising:
a magnetic head;
a flexure supporting said magnetic head and having wiring to transmit information received and read by said magnetic head and information for writing by said magnetic head;
a load beam supporting said flexure and which generates a load to balance said head;
a base plate, to mount said head, said load beam, and said flexure on an actuator arm; and,
a damping material affixed to said base plate, wherein
said load beam and said base plate have a mutually overlapping portion, said damping material is provided with a folded-over portion which absorbs the step between said load beam and said base plate, and said damping material is affixed to said load beam and to said base plate from the side of said overlapping portion of said load beam.

10. A magnetic head assembly comprising:
a magnetic head;
a flexure supporting said magnetic head and having wiring to transmit information received and read by said magnetic head and information for writing by said magnetic head;
a load beam supporting said flexure and which generates a load to balance said head;
a base plate, to mount said head, said load beam, and said flexure on an actuator arm; and,
a damping material affixed to said base plate, wherein
said base plate has a penetrating hole, and said damping material is affixed near said penetrating hole, said load beam and said base plate have a mutually overlapping portion, said load beam is provided with a taper so as to smooth the boundary with said base plate, and said damping material is affixed to said load beam and to said base plate from the side at said overlapping portion of said load beam.

11. A magnetic head assembly comprising:
a magnetic head;
a flexure supporting said magnetic head and having wiring to transmit information received and read by said magnetic head and information for writing by said magnetic head;
a load beam supporting said flexure and which generates a load to balance said head;
a base plate, to mount said head, said load beam, and said flexure on an actuator arm; and,
a damping material affixed to said base plate, wherein
said base plate has a penetrating hole, and said damping material is affixed near said penetrating hole, said load beam and said base plate have a mutually overlapping portion, said damping material is provided with a folded-over portion which absorbs the step between said load beam and said base plate, and said damping material is affixed to said load beam and to said base plate from the side of said overlapping portion of said load beam.

12. The magnetic head assembly according to claim 1, wherein said damping material uses polymide or stainless as said constraining layer and uses viscoelastic material as said elastic layer.

13. The magnetic head assembly according to claim 2, wherein said damping material uses polyimide or stainless as said constraining layer and uses a viscoelastic material as said elastic layer.

14. The magnetic head assembly according to claim 6, wherein said damping material uses polyimide or stainless as said constraining layer and uses a viscoelastic material as said elastic layer.

* * * * *